(12) United States Patent
Perry

(10) Patent No.: US 6,765,810 B2
(45) Date of Patent: Jul. 20, 2004

(54) FULL-WAVE COUPLED INDUCTOR POWER CONVERTER HAVING SYNCHRONOUS RECTIFIERS AND TWO INPUT SWITCHES THAT ARE SIMULTANEOUSLY OFF FOR A TIME PERIOD OF EACH SWITCHING CYCLE

(75) Inventor: Marty Perry, Tucson, AZ (US)

(73) Assignee: Artesyn Technologies, Inc., Boca Raton, FL (US)

(*) Notice: Subject to any disclaimer, the term of this patent is extended or adjusted under 35 U.S.C. 154(b) by 0 days.

(21) Appl. No.: 10/341,011

(22) Filed: Jan. 13, 2003

(65) Prior Publication Data

US 2004/0022075 A1 Feb. 5, 2004

Related U.S. Application Data

(60) Provisional application No. 60/400,740, filed on Aug. 2, 2002.

(51) Int. Cl.[7] ............................................. H02M 3/335
(52) U.S. Cl. .................................................... 363/21.06
(58) Field of Search ........................ 363/17, 20, 21.04, 363/21.06, 21.12, 21.14, 65, 67, 131

(56) References Cited

U.S. PATENT DOCUMENTS

| | | | |
|---|---|---|---|
| 4,300,191 A | | 11/1981 | Baranowski et al. |
| 4,914,561 A | | 4/1990 | Rice et al. |
| 5,132,888 A | | 7/1992 | Lo et al. |
| 5,291,382 A | | 3/1994 | Cohen |
| 5,325,283 A | | 6/1994 | Farrington et al. |
| 5,414,609 A | * | 5/1995 | Levran et al. ................. 363/17 |
| 5,754,413 A | | 5/1998 | Fraidlin et al. |
| 6,111,769 A | | 8/2000 | Zhang et al. |
| 6,147,886 A | | 11/2000 | Wittenbreder |
| 6,188,592 B1 | * | 2/2001 | Farrington et al. ........... 363/98 |
| 6,272,023 B1 | | 8/2001 | Wittenbreder |
| 6,324,077 B1 | * | 11/2001 | Lopresti et al. ................. 363/16 |
| 6,407,934 B1 | * | 6/2002 | Ishii et al. ................. 363/21.14 |
| 6,445,597 B1 | * | 9/2002 | Boylan et al. ............ 363/21.06 |
| 6,473,317 B1 | * | 10/2002 | Simopoulos ............. 363/21.06 |
| 6,504,735 B2 | * | 1/2003 | Negru et al. .................. 363/25 |
| 6,600,668 B1 | * | 7/2003 | Patel et al. ............... 363/21.06 |
| 6,625,043 B2 | * | 9/2003 | Hatta et al. .............. 363/21.06 |

FOREIGN PATENT DOCUMENTS

SU    892614    12/1981

* cited by examiner

Primary Examiner—Adolf Berhane
(74) Attorney, Agent, or Firm—Kirkpatrick & Lockhart LLP

(57) ABSTRACT

A DC-DC power converter is presented. According to one embodiment, the converter includes first and second transformers, and a double-ended input circuit, including first and second primary switches, for generating an alternating voltage across the primary windings of the first and second transformers. The converter also includes a control circuit (such as, for example, a PWM control circuit) for controlling the primary switches such that the primary switches are simultaneously OFF for a first time period during a switching cycle of the converter. In addition, the converter includes first and second synchronous rectifiers. The first synchronous rectifier is coupled to the secondary winding of the first transformer and the second synchronous rectifier is coupled to the secondary winding of the second transformer. The first synchronous rectifier may be for rectifying a voltage across the secondary winding of the first transformer and the second synchronous rectifier may be for rectifying a voltage across the secondary winding of the second transformer. Further, the control circuit is for controlling the first and second synchronous rectifiers such that the first and second synchronous rectifiers are simultaneously ON for a second time period during the switching cycle.

27 Claims, 5 Drawing Sheets

FIG. 4a  Clock
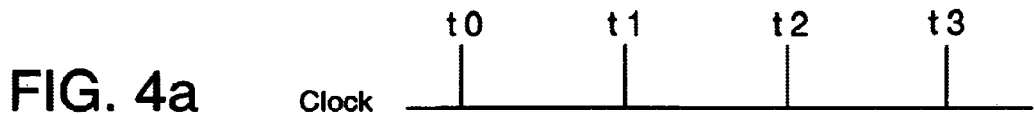
FIG. 4b  Pulse A
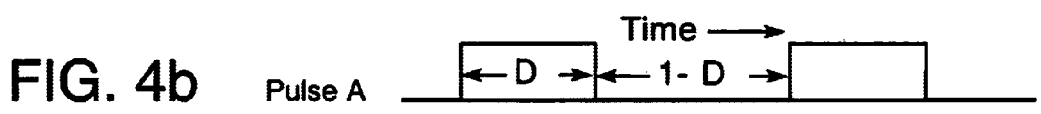
FIG. 4c  Pulse B
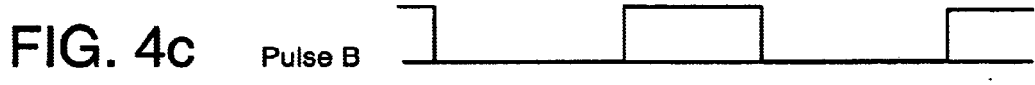
FIG. 4d  Inverted A
FIG. 4e  Inverted B
FIG. 4f  Winding 44 Forward Current
FIG. 4g  Winding 44 Flyback Current
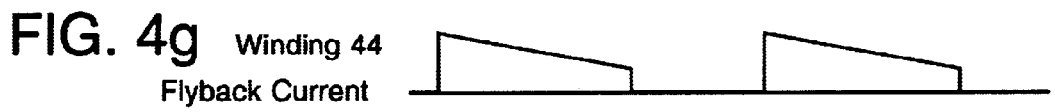
FIG. 4h  Winding 44 Total Current
FIG. 4i  Winding 45 Forward Current
FIG. 4j  Winding 45 Flyback Current
FIG. 4k  Winding 45 Total Current
FIG. 4l  $i_{44} + i_{45}$ Total Load Current

FULL-WAVE COUPLED INDUCTOR POWER CONVERTER HAVING SYNCHRONOUS RECTIFIERS AND TWO INPUT SWITCHES THAT ARE SIMULTANEOUSLY OFF FOR A TIME PERIOD OF EACH SWITCHING CYCLE

CROSS-REFERENCE TO RELATED APPLICATIONS

This application claims priority under 35 U.S.C. §119 to U.S. provisional patent application Serial No. 60/400,740, filed Aug. 2, 2002, which is incorporated herein by reference.

BACKGROUND OF THE INVENTION

1. Field of the Invention

The present invention relates generally to DC-DC power conversion.

2. Background of the Invention

DC-DC power converters are power-processing circuits that convert an unregulated DC input voltage to a regulated DC output voltage, usually at a different level, for powering a load. A vast variety of topologies for DC-DC converters have been introduced over the years, but not all are suitable for delivering the low voltage and high current outputs that are now required by microprocessor, memory and other integrated circuit loads. Further, the need for small size and high efficiency places additional limitations on the available topologies. Small size equates to high power density, and power density is the ratio of output power capability to converter volume.

To achieve high power density, the power loss must be low, or the operating temperature will increase, and additional thermal management devices, such as heatsink dissipators, may be required. The use of such devices defeats the objective to obtain high power density. To avoid heatsinks under normal operating conditions, the conduction losses must be minimized, and synchronous rectifiers have been shown to greatly improve rectification efficiency.

Synchronous rectifiers require a control signal to drive the device to a low resistance state and provide very low loss conduction, but they also include an internal diode, which can conduct current, albeit with higher losses. A proper control strategy is needed to ensure that the internal diode does not conduct. Synchronous rectifiers can also conduct in reverse, and this could produce a short circuit, so the controlling circuit must be carefully designed.

A fundamental DC-DC power conversion topology is the single-ended forward converter shown in FIG. 1a. This topology, when controlled by a constant frequency, pulse-width-modulation (PWM) control circuit 10, provides excellent regulation and fast response time. In operation, the primary switch 11 is turned ON to apply the source voltage $V_{in}$ to the transformer 12. Immediately, a secondary voltage appears, and current flows simultaneously in the primary winding 13 and secondary winding 14, and energy is transferred forward. The secondary load current flows through diode 15, and diode 16 is reverse biased at this time. The difference between the secondary winding voltage and the output voltage $V_{out}$ appears across the filter inductor 17, and energy is stored in the inductor 17 during this ON period. In addition, the inductor 17 limits the rate of change of current during the ON period.

When switch 11 is turned OFF, the current in the secondary winding 14 vanishes, but load current continues to flow through diode 16 and inductor 17, and the stored energy in the inductor 17 provides continuity of current to the filter capacitor 18 and output $V_{out}$. The current in the transformer primary winding 13 also vanishes except for a small amount of magnetizing current. Various methods have been disclosed to reset the transformer core during the OFF period, and these are well known to those skilled in the art. The primary and secondary winding voltages will reverse during reset, and diode 15 is reverse biased disconnecting the load (not shown) from the transformer 12.

The single-ended circuit of FIG. 1a is not optimal, and one deficiency is that energy for the entire switching cycle must be drawn from the source ($V_{in}$) during the ON period of the primary switch 11, and an equivalent period of time is required for the OFF period of the primary switch to allow the core to reset. The single pulse of high current followed by a long dead time results in a high RMS current and excessive conduction loss in the primary circuit, thus limiting the topology to low power applications. Furthermore, the output voltage $V_{out}$ is the average value of the pulsed waveform that appears on the secondary winding 14, and due to the extended dead time, each rectifier (i.e., diodes 15, 16) experiences a peak reverse voltage much higher than the average. Because rectification is only accomplished approximately half of the time, i.e. during the ON period of the primary switch, the topology is known as half-wave.

These deficiencies are almost entirely removed by the double-ended topology of FIG. 1b. The double-ended topology operates much like two overlapping single ended circuits and has similar control and response characteristics. The power converter of FIG. 1b includes a second primary switch 21, which is controlled ON during the time switch 20 is OFF. In operation, switch 20 first connects the primary winding 22 to input capacitor 23, and then switch 21 connects the same winding 22 to input capacitor 24. This results in an alternating voltage across the primary winding 22. The voltage across each of the input capacitors 23, 24 will be one-half the source voltage $V_{in}$.

Energy is transferred to the secondary windings 26, 27 during the ON period of each primary switch 20, 21, and the core flux, which increases during the first ON period, is reset during the subsequent ON period. A dead time for reset is not required. However, dead time may be used along with a PWM regulation technique, provided by PWM control circuit 25. This control time can be varied from zero to a full half-cycle. With a double-ended topology, two current pulses of lower magnitude are drawn from the source during each switching cycle, and the primary winding 22 carries bipolar current with an improved RMS value.

The half-bridge topology of FIG. 1b is shown with two secondary windings 26, 27, and each is connected to one of the rectifying diodes 28, 29. The diodes 28, 29 alternately conduct current from their respective secondary windings 26, 27 when they are forward biased, and the rectification is known as full-wave. The more continuous current to the output $V_{out}$ reduces the requirement for energy storage during any dead time which may occur, and the inductor 30 consequently may be made smaller.

One known variation to these topologies is to translate the filter inductor to the primary circuit. A single ended circuit according to this variation is shown in FIG. 2, and the core reset mechanism is not shown. The primary winding 32 and inductor winding 33 now carry primary current, which is typically less than load current. In addition, as before, the inductor 33 stores energy during the ON period of the primary switch 31. However, to permit discharge of this energy during the OFF period, a second winding 35 must be added to the inductor and connected through a diode 37 to the output $V_{out}$. Effectively, the inductor has become a second flyback transformer with its primary 33 connected in series with the primary winding 32 of the first transformer 39. The ratio of the primary 33 to secondary 35 turns on the inductor may be identical to the ratio of the primary 32 to secondary 34 turns on the transformer 39.

With the filter inductor 33 located in the primary circuit the input voltage drops across it, and a reduced voltage is applied to the transformer 39. In operation, the secondary windings 34, 35, and diodes, 36, 37 are connected directly to the output voltage $V_{out}$, and the winding and reverse diode voltages are limited to the magnitude of the output voltage $V_{out}$. A constant frequency PWM control technique can be applied to the primary switch 31 to regulate the output voltage $V_{out}$. Double-ended topologies pursuant to this variation, including a half-bridge type that is analogous to FIG. 1b, are also known.

Still, none of the above topologies define a suitable control method when synchronous rectifiers are used to reduce rectification losses. Accordingly, there exists a need in the art for a power conversion topology and control technique that is compatible with synchronous rectification and yet capable of satisfying the requirements for high power density and low voltage, high current output.

SUMMARY OF THE INVENTION

In one general respect, the present invention is directed to a DC-DC power converter. According to one embodiment, the converter includes first and second transformers, and a double-ended input circuit, including first and second primary switches, for generating an alternating voltage across the primary windings of the first and second transformers. The converter also includes a control circuit (such as, for example, a PWM control circuit) for controlling the primary switches such that the primary switches are simultaneously OFF for a first time period during a switching cycle of the converter. In addition, the converter includes first and second synchronous rectifiers. The first synchronous rectifier is coupled to the secondary winding of the first transformer and the second synchronous rectifier is coupled to the secondary winding of the second transformer. The first synchronous rectifier may be for rectifying a voltage across the secondary winding of the first transformer and the second synchronous rectifier may be for rectifying a voltage across the secondary winding of the second transformer. Further, the control circuit is for controlling the first and second synchronous rectifiers such that the first and second synchronous rectifiers are simultaneously ON for a second time period during the switching cycle. The first time period and the second time period may be the same, thereby providing simultaneous conduction of the synchronous rectifiers when the primary switches are simultaneously OFF.

According to various embodiments of the power converter, the control circuit may control the first synchronous rectifier such that when the first primary switch is ON, the first synchronous rectifier is simultaneously ON such that the first transformer transfers energy forward. Similarly, the PWM control circuit may control the second synchronous rectifier such that when the second primary switch is ON, the second synchronous rectifier is simultaneously ON such that second transformer transfers energy forward.

Additionally, the control circuit may control the first synchronous rectifier such that the first synchronous rectifier may be turned ON prior to the time the first primary switch is turned on, such that there may exist a delay therebetween. Similarly, the control circuit may control the second synchronous rectifier such that the second synchronous rectifier may be turned ON prior to the time the second primary switch is turned on, with delay therebetween as well. In addition, the synchronous rectifiers may conduct to discharge energy stored in their associated transformers pursuant to a flyback transformer mode of operation.

Implementations of the power converter, according to other various embodiments may include one of more of the following features. For example, the control circuit may include a PWM control circuit. In addition, the double-ended input circuit may include, for example, a half-bridge input circuit, a full-bridge input circuit or a push-pull input circuit. The primary windings of the first and second transformers may be connected in series, as may the secondary windings. In addition, the turns ratios of the first and second transformers may be the same. According to another embodiment, the synchronous rectifiers may be self-driven.

Benefits that may be realized with a power converter according to the present invention include high density with low voltage/high current output. These and other advantages of the present invention will be apparent from the description to follow.

DESCRIPTION OF THE FIGURES

Embodiments of the present invention are described in conjunction with the following figures, wherein:

FIGS. 4a–4l are timing diagrams illustrating the operation of the converter of FIG. 3 according to one embodiment of the present invention.

DETAILED DESCRIPTION OF THE INVENTION

Figure 1A:
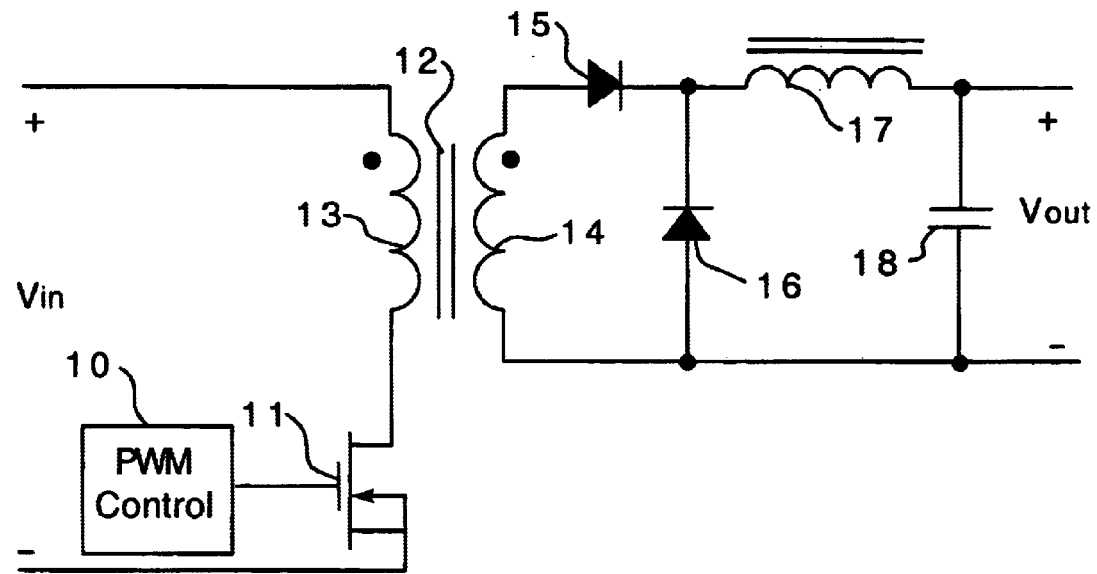
FIGS. 1a, 1b and 2 are schematic diagrams of prior art DC-DC converters.
Figure 1B:
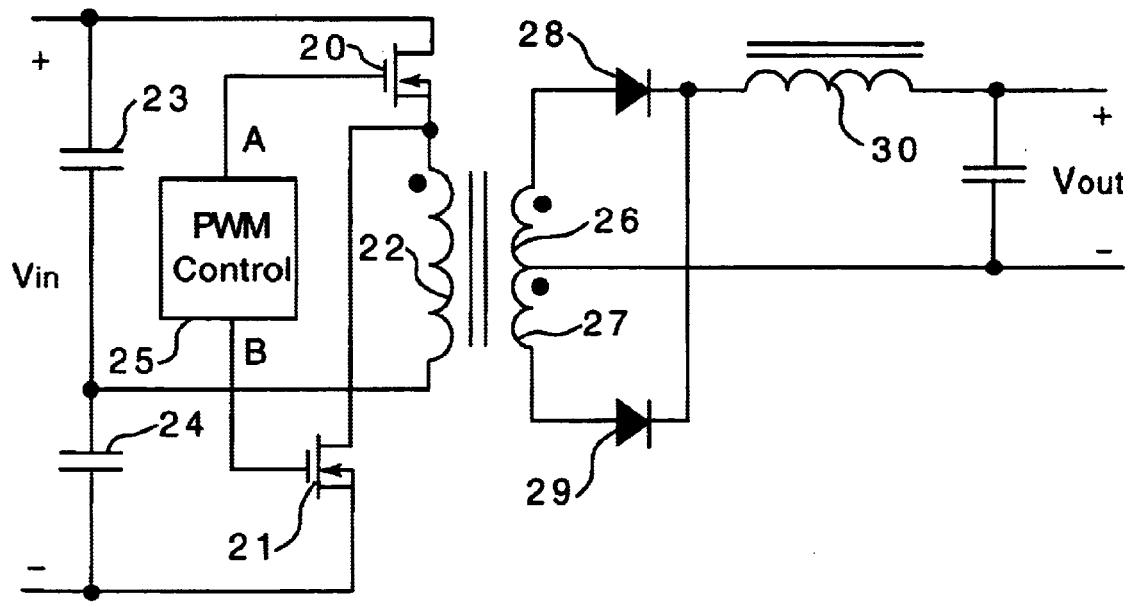
Figure 2:
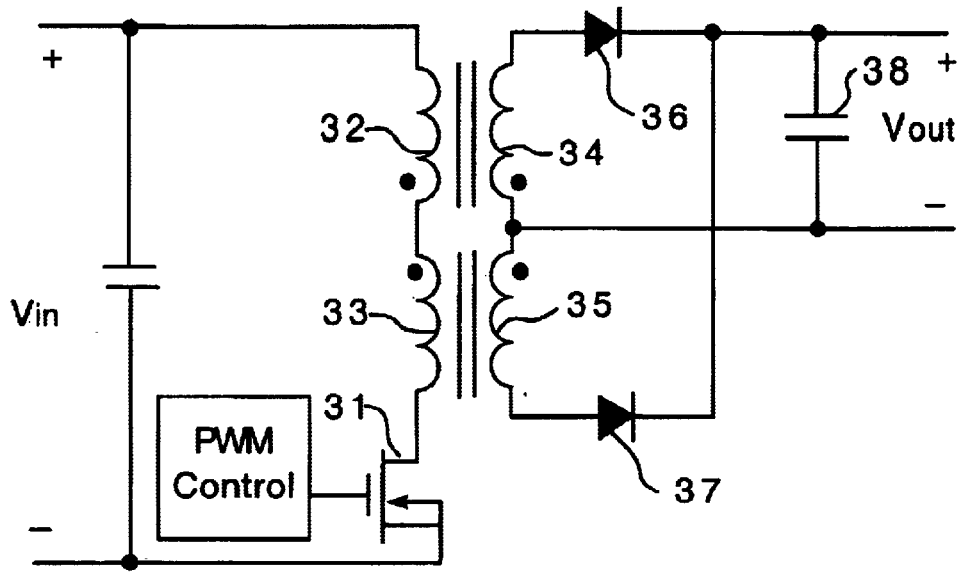
Figure 3:
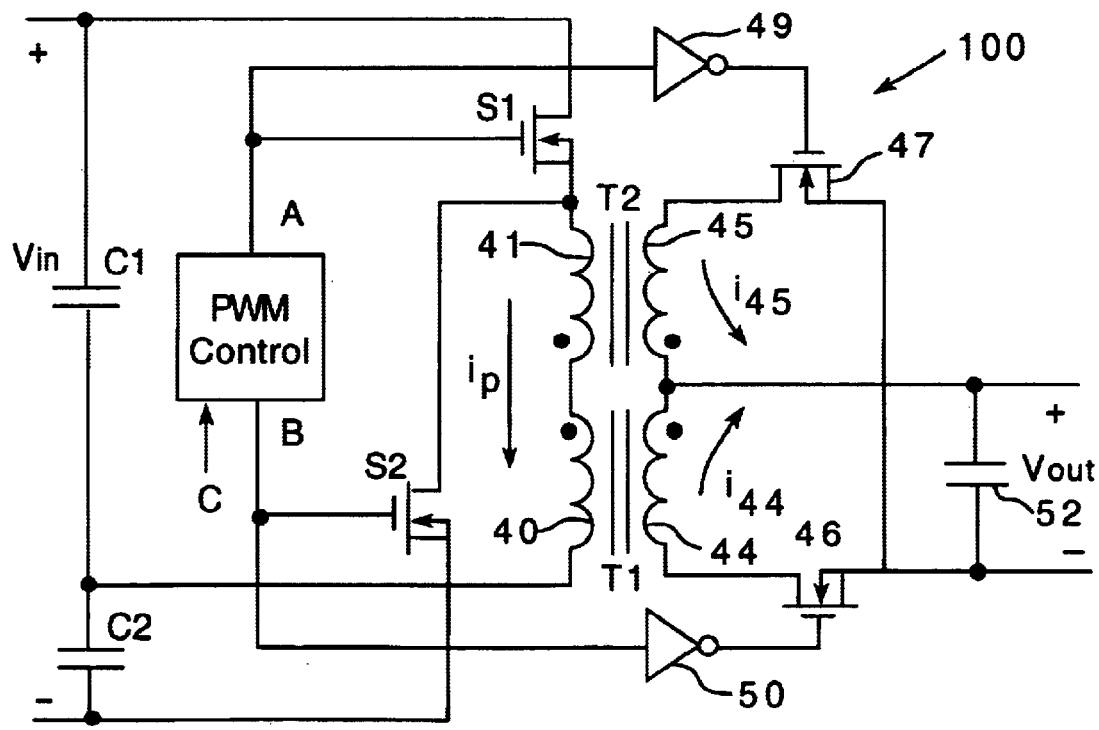
FIG. 3 is a schematic diagram of a DC-DC converter according to one embodiment of the present invention.

FIG. 3 is a schematic diagram of a DC-DC converter 100 according to one embodiment of the present invention. The converter 100 includes a pair of transformers T1, T2 and a double-ended input circuit for generating an alternating voltage across the primary windings 40, 41 of the transformers T1, T2 as per conventional double-ended configurations. In the embodiment of FIG. 3, the double-ended input circuit includes a half-bridge input circuit, comprising primary switches S1, S2 and input capacitors C1, C2. The two input capacitors C1 and C2 divide the input voltage $V_{in}$ such that each capacitor has one-half of the input voltage across it. The input capacitors C1, C2 also provide for input filtering.

As detailed below, the transformers T1, T2 are combined transformers-inductors. The second transformer T2 serves as the filter inductor for the first transformer T1 during a first ON period of switch S1, and the first transformer T1 serves as the filter inductor for the second transformer T2 during a second ON period of switch S2. A control circuit 48 supplies alternating drive pulses A and B to the respective primary switches S1, S2, which couple the source voltage $V_{in}$ to the two transformers T1, T2. Each drive pulse A, B has a relatively long OFF period during which the corresponding transformer (T1 or T2) is reset. Each transformer T1, T2 includes a secondary winding, 44 or 45, and the primary to secondary turns ratios of the two transformers T1, T2 may be identical. Each secondary winding 44, 45 permits energy transfer as in a forward converter, and also provides for discharge of stored energy as in a flyback converter. These two transformer actions can occur simultaneously as will described in detail below.

As shown in the illustrated embodiment, the secondary windings 44, 45 are connected to synchronous rectifiers 46, 47, which may conduct with overlapping ON periods. An output capacitor 52 is connected across the load (not shown) for providing output filtering.

The control circuit 48 supplies properly timed drive pulses to the synchronous rectifiers 46, 47 to ensure that each device is driven to its low resistance state (i.e., ON state) during the entire period that it is required to conduct current. These drive pulses are the inverse of the primary switch drive pulses A, B, and this is represented by signal inverters 49 and 50. Each inverted signal has a long ON period, which ensures that the appropriate synchronous rectifier is enabled for the full time it is required to conduct. Finally, the control circuit 48 provides for a variable dead time between the A and B signals, in response to a feedback input C, to implement PWM control to regulate the output voltage. Accordingly, the control circuit 48 is sometimes referred to herein as a "PWM controller,"

As used herein, a switch is ON when it is in a low resistance state and conversely, a switch is OFF when it is in a high resistance state. In addition, as illustrated in FIG. 3, the primary switches S1, S2 and the synchronous rectifiers 46, 47 may be implemented as MOSFETs, for example.

In the embodiment of FIG. 3, the PWM controller 48 provides drive signals to the primary switches S1 and S2, and the secondary synchronous rectifiers (SR) 46, 47. The PWM controller 48 may be a double-ended or push-pull type, and may include a suitable integrated circuit for providing this function, such as, for example, the UCC2808A manufactured by Texas Instruments. The PWM controller 48 may include an internal clock, which sets the operating frequency of the converter 100.

The regularly spaced clock pulses, according to one embodiment are shown in FIG. 4a. To attain small size for the converter 100, the switching frequency must be high, and frequencies the order of 300–500 kHz are typical. Logic circuitry within the PWM controller 48 may create two complementary outputs, shown as A and B in FIG. 3, which alternately drive the primary switches S1, S2. The timing of these drive pulses is shown in FIG. 4b and FIG. 4c, respectively. The interval D represents the time period when the drive signal A is high, corresponding to the ON time of the primary switch S1 (assuming an ideal switch). The interval 1-D represents the time period when the drive signal is low, corresponding to the OFF time of the primary switch S1 (assuming an ideal switch). The same description may be applied to drive pulse B and primary switch S2.

Each drive pulse A, B may be initiated by an alternate clock pulse. Each drive pulse A, B may terminate a time period before the next clock pulse, thereby creating a dead time, i.e., a time interval when both primary switches S1, S2 are in the OFF state. The length of the dead time may be determined by a feedback input C to the control circuit 48. As the dead time increases, the output of the converter 100 will decrease. Such feedback circuits (not shown) are well known to those skilled in the art, and many arrangements exist that could be used to control and regulate the output voltage of the converter. Accordingly, a description of such feedback circuits is not provided herein.

According to one embodiment, the two transformers structures T1, T2 may be separate, i.e., they are not wound on the same core. Therefore, it is possible to analyze operation by considering the converter as two single-ended converters with their outputs connected in parallel. The first of these two converters is represented by transformer T1 with primary winding 40 and transformer T2 with inductive winding 41. The dots at the ends of these windings represent the relative polarity of all windings per standard convention. When switch S1 is driven ON at to by drive pulse A, series connected windings 40 and 41 are coupled to capacitor C1, and the primary current $i_p$ rises. Through forward coupling, the transformer T1 supplies energy to secondary winding 44, and the initial forward current is limited to the current in winding 45 at time $t_0$. Note that positive voltage is applied to the dotted end of winding 40, and therefore positive voltage appears on the dotted end of secondary winding 44. Load current $i_{44}$ flows to the load (across $V_{out}$) from the dotted end of winding 44 and returns through SR 46. Neglecting losses, the voltage across winding 44 is equal to the output voltage $V_{out}$, and the voltage across primary winding 40 equals $V_{out}/\eta$, where $\eta$ is the turns ratio of T1, i.e. $\eta=N_s/N_p$, where $N_s$ is the number of secondary turns on winding 44 and $N_p$ is the number of primary turns on winding 40.

Simultaneously, energy is being stored in the transformer T2, and the inductive effect limits the rise of current in the primary circuit. During the ON period of S1, the voltage across winding 41 is: $V_{41}=V_{in}/2-V_{out}/\eta$, and this voltage is typically greater than the voltage across the winding 40.

The current $i_p$ in the primary windings 40 and 41 will ramp upward at a rate determined by the inductance (L) of winding 41, and the rate is $di_p/dt=V_{41}/L$. This is a typical effect seen in forward converters regardless of whether the inductor is in the primary or secondary circuit. In the circuit of FIG. 3, the upward ramp of forward current is reflected to the secondary winding 44 (see FIG. 4f).

Identical operation takes place during the ON period of S2 for the second single-ended converter. In this case, transformer T2 is connected by S2 to capacitor C2, and the inductance of winding 40 limits the rise of current $-i_p$ (i.e. in reverse to the direction indicated in FIG. 3), and energy stored in T1 increases. The symmetric operation of the primary switches S1, S2 assures that the voltages across C1 and C2 remain balanced and equal to one-half the input voltage. Positive voltage is now applied to the dotted end of the winding 41 and the secondary winding 45 delivers current ($i_{45}$) to the load through SR 47. It is apparent from FIG. 3 that winding 45 and SR 47 of the second single-ended converter are in parallel with winding 44 and SR 46 of the first single-ended converter.

Considering again the first single-ended converter in which T1 is driven by switch S1, and with the understanding that energy is stored in T1 during the ON period of S2, that energy will discharge, as in a flyback transformer, through winding 44 (see FIG. 4g) during the conduction of SR 46. That is, the transfer of flyback energy takes place simultaneously with the conduction of forward energy as described above. The initial flyback current in winding 44 at to is equal to the final value of inductive current in winding 41, and the current is translated to the secondary by the inverse turns-ratio. During the entire conduction period, the flyback current ramps downward at a rate determined by: $di_f/dt=-V_{out}/(L\eta^2)$, and this component of winding 44 current is shown in FIG. 4g. Recalling that the forward current transferred from the primary was ramping upward (FIG. 4f), it is clear that the total current to the load (FIG. 4h) increases at a lesser rate during the overlap period. That is, the rate of change of current is substantially reduced in the combined flow of forward current and energy discharge current.

Identical operation occurs in T2 during the ON period of S2, and secondary winding (45) currents are shown in FIG. 4i, FIG. 4j and FIG. 4k. The two currents $i_{44}$ and $i_{45}$ of FIG. 4h and FIG. 4k are summed together in FIG. 4l. As can be seen in FIG. 4l, the change of load current, also called ripple current, is substantially eliminated in the combination.

The dead time, during which S1 and S2 are both OFF, is apparent in FIG. 4h and FIG. 4k. During this period, there is no forward energy transfer. Both T1 and T2 discharge stored energy and the conduction of SR 46 and SR 47 overlaps. Winding 44 and winding 45 are both coupled to $V_{out}$, and the voltage on primary winding 41 is equal but opposite to the voltage on primary winding 40. As a result, the sum of the voltage across both primaries 40, 41 is equal to zero, and the voltage at the junction of S1 and S2 is equal to the voltage at the junction of input capacitors C1, C2, or one-half the input voltage $V_{in}$. It may be said that the converter 100 "freewheels" during this period.

FIG. 4h and FIG. 4k show that the conduction of SR 46 and SR 47 also overlap. FIG. 4e, which is inverted drive pulse B applied to SR 46, shows that the SR 46 is driven to its low resistance ON state for the full period it is required to conduct. Similarly, FIG. 4d, which is inverted drive pulse A applied to SR 47, drives the SR 47 to its low resistance ON state for the full period when the SR 47 is required to conduct. In this manner, any conduction of the body diode inherent in the SRs 46, 47 is made negligible or eliminated. Accordingly, the rectification efficiency is maximized.

An extended conduction period for each secondary winding 44, 45 is enabled, optimizing the RMS to average current ratio. Furthermore, the filter inductor winding does not appear in the high current secondary, and this reduces conduction losses. The series primary windings 40, 41 conduct during both half-cycles of operation, and one winding transfers energy to the secondary while the other stores energy for later release. The bipolar primary winding current optimizes the RMS to average current ratio in the primary circuit, and the current in the primary is typically lower by virtue of a step-down transformer ratio. High-efficiency may be realized with readily achieved winding resistances, enabling minimized conduction losses throughout the converter 100.

The dead time between pulse A and pulse B can be varied to regulate the output voltage $V_{out}$ for changes in input voltage $V_{in}$ and/or load current, and the effect of this dead time can be analyzed by considering the converter 100 as two single-ended forward converters. FIG. 4b shows the drive pulse applied to S1. As can be seen in this figure ON period (D) is followed by a longer OFF period (1-D). According to one embodiment, the ON time (D) of this signal is less than the OFF time (1-D), wherein the total period of the single-ended converter is normalized to unity. This period, i.e., the switching cycle, is equal to the time of two sequential clock pulses (e.g., $t_0$ to $t_2$). The duty-cycle of the single-ended forward converter 100, denoted as δ, equals D. Therefore, the output voltage is given by $V_{out}=V_{in}\delta$, where δ is less than 0.5. This same analysis applies to the single-ended forward converter formed by T2, which is driven by S2. The secondary winding and rectifier circuits for each transformer operate in parallel and couple to the same output voltage. The current from each single-ended circuit combines to energize the load, and it is apparent that each single-ended converter may deliver one-half the load energy.

Overall, the converter 100 of FIG. 3 may provide several stages of voltage reduction from the input to the output. These include:

a) The half-bridge circuit divides the input by two.

b) The transformers T1, T2 may provide voltage step-down by virtue of their turns-ratio.

c) The topology may exhibit a single-ended transfer function having a duty-cycle of less than one-half, accounting for additional voltage reduction proportional to the duty-cycle. Nevertheless, the topology preserves the double-ended benefits of low RMS current and low output ripple.

The drive pulses to the synchronous rectifiers 46, 47 may receive their timing through a simple inversion of the A and B pulses from the control circuit 48 that provides control to the primary switches S1, S2. Additional control logic to drive the SRs may be unnecessary. Each SR 46, 47 is driven ON prior to the time its associated primary switch S1, S2 is driven ON. That is, SR 46 is turned on prior to S1 being turned ON, with a delay therebetween. Similarly, SR 47 is turned on prior to S2 being turned ON, with a delay therebetween as well. This ensures that the energy stored in the transformers T1, T2 always has a path to the load.

Unlike diodes, when synchronous rectifiers are driven on, they can conduct in either direction. A light loads, it is possible that the energy transferred and stored during ON time D would be greater than the load requirement, and without synchronous rectifiers, the dead time would have to increase considerably to maintain regulation. However, the SRs 46, 47 will conduct some energy from the output back through the transformer, and return it to the source. Therefore the inductor elements always remain in critical or continuous conduction. Although this back and forth exchange of energy appears inefficient, it only occurs at light loads where the conduction losses are extremely low, and any loss does not significantly increase the thermal management requirements. Furthermore, there is a benefit to keeping the duty cycle at the normal duration, and this improves response time when the load is increased.

According to other embodiments, the synchronous rectifier 46 may be turned on simultaneously with the primary switch S1 and/or the synchronous rectifier 47 may be turned on simultaneously with the primary switch S2. According to yet other embodiments, the synchronous rectifier 46 may be turned on after the primary switch S1 is turned on and/or the synchronous rectifier 47 may be turned on after the primary switch S2 is turned on. Such an embodiment may be more practicable at higher switching frequencies.

Figure 5:
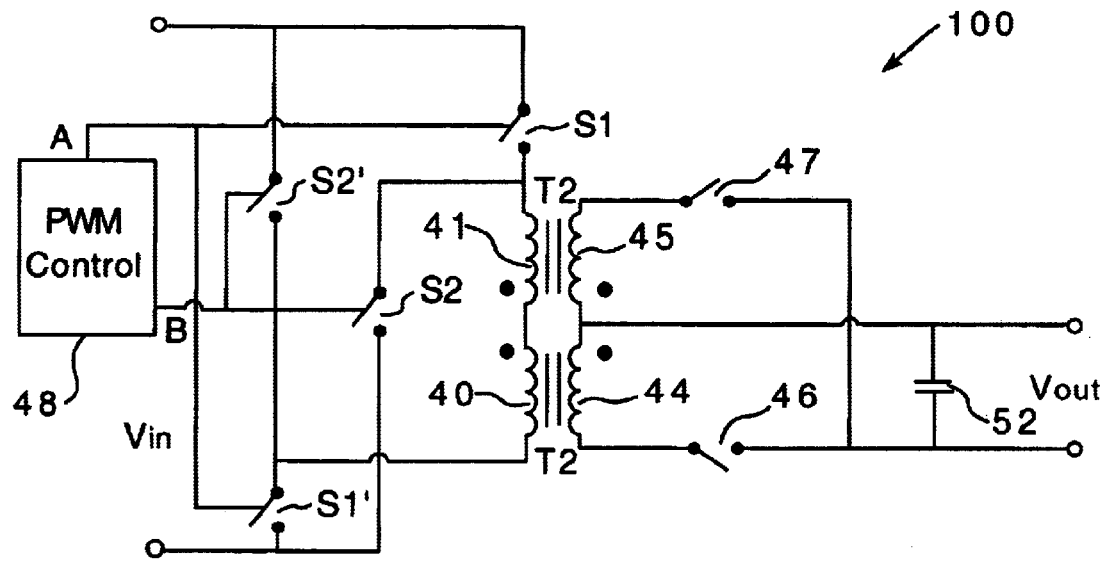
FIGS. 5–8 are schematic diagrams of the DC-DC converter according to other embodiments of the present invention.

FIG. 5 is a schematic diagram of the converter 100 according to another embodiment of the present invention. The converter 100 of FIG. 5, including the operation thereof, is similar to that of FIG. 3, except that in FIG. 5 the double-ended input circuit includes a full-bridge input circuit comprising primary switches S1, S1', S2 and S2'. For the converter 100 of FIG. 5, the primary switches S1 and S1' are controlled synchronously. That is, according to one embodiment, both primary switches S1, S1' may be controlled with drive pulse A from the PWM controller 48. Similarly, the primary switches S2 and S2' are controlled synchronously, i.e., both may be controlled with drive pulse B from the PWM controller 48, for example. For convenience, the primary switches S1, S1', S2, S2' and the SRs 46, 47 are shown in FIG. 5 as mechanical switches with the recognition that they may be implemented as semiconductor switches, such as MOSFETs, for example. The same convenient notation is used in FIGS. 6 and 7, described hereinafter.

Figure 6:
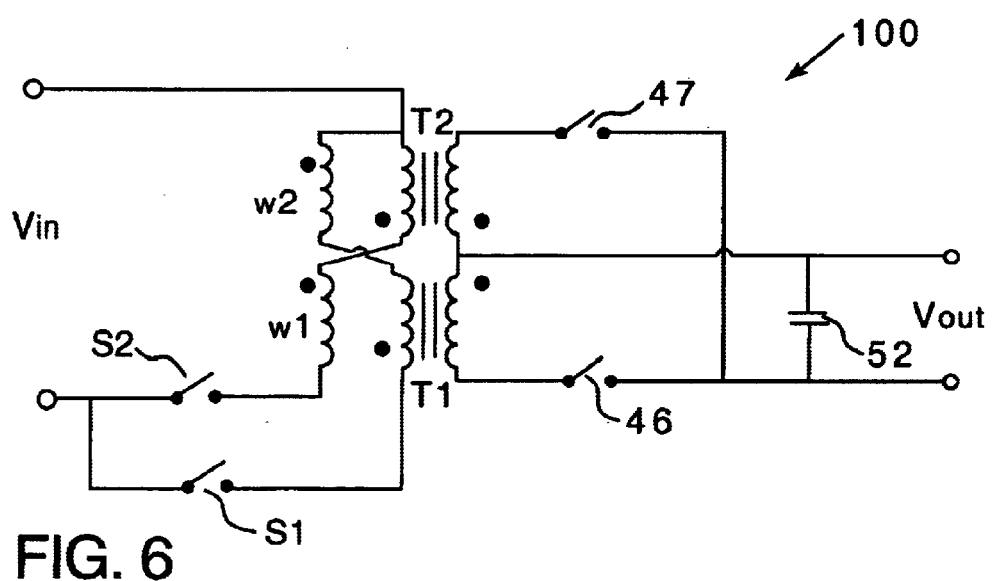

FIG. 6 is a schematic diagram of the converter 100 according to another embodiment of the present invention. The converter 100 of FIG. 6 is similar to that of FIG. 5, except that in FIG. 6 the double-ended input circuit includes a push-pull input circuit. In this arrangement, additional windings w1, w2 are added to each transformer T1, T2 respectively, so as to apply the same volt second products as the full bridge configuration of FIG. 5. The primary switches S1, S2, as well as the SRs 46, 47 may be controlled as described previously in connection with FIGS. 3 and 4a–4l. For convenience, the PWM controller 48 is not shown in FIG. 6, or in the embodiments disclosed in FIGS. 7 and 8, to be described hereinafter. The full-bridge and push-pull embodiments may have benefits at lower input voltages where the 2:1 reduction of the half-bridge is not required.

Figure 7:
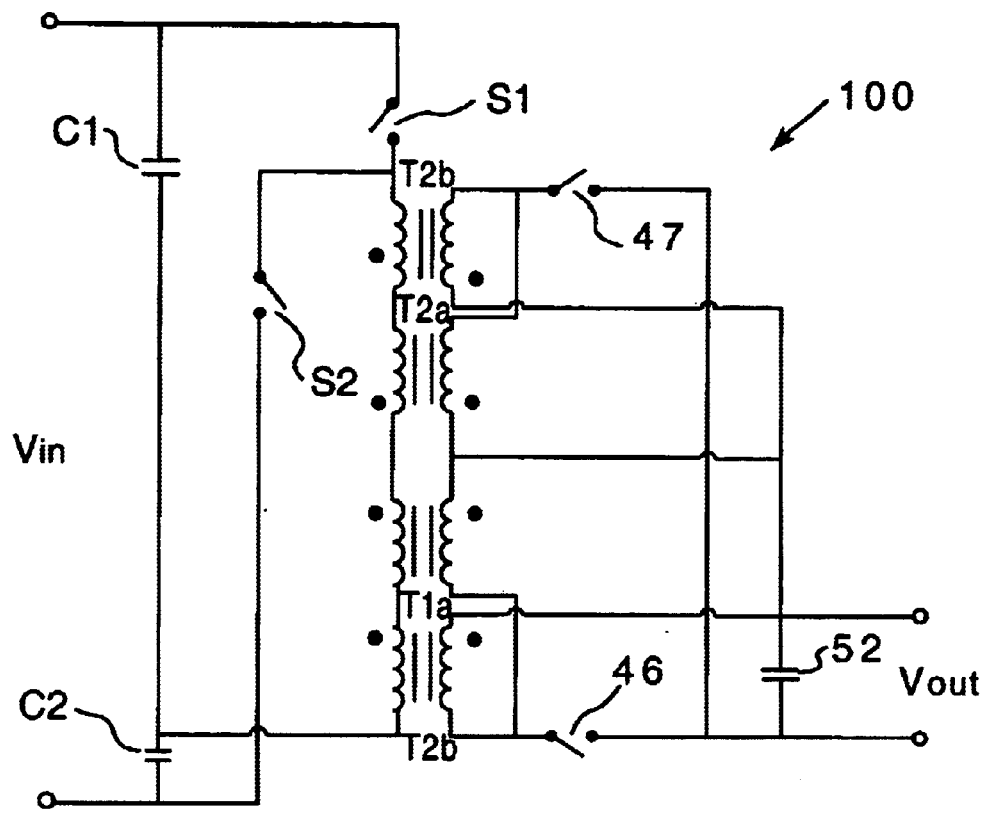

According to another embodiment, as illustrated in FIG. 7, the converter 100 can be configured whereby each transformer T1, T2 is subdivided into a plurality of series/parallel-coupled elements. The number of sub-elements of the transformers T1, T2 may be any desired value. In the illustrated embodiment of FIG. 7, each transformer T1, T2 is sub-divided into two elements (T1a, T1b and T2a, T2b). Such a configuration may be used for applications where a distributed magnetic structure may be useful to obtain a low profile. The sub-divided series/parallel configuration is applicable to any of the previously described embodiments.

In certain applications, such as in a distributed power system, it may be desirous to devise a fixed ratio isolation stage. This is sometimes referred to as a "DC transformer." According to such an embodiment, the primary switches (e.g., S1 and S2 in FIG. 3) may be operated at a fixed duty cycle near 50%. That is, the primary switches may be controlled with a fixed duty cycle control circuit rather than a PWM control circuit, and the delay prior the to turn-on of the synchronous rectifiers may be minimized.

Figure 8:
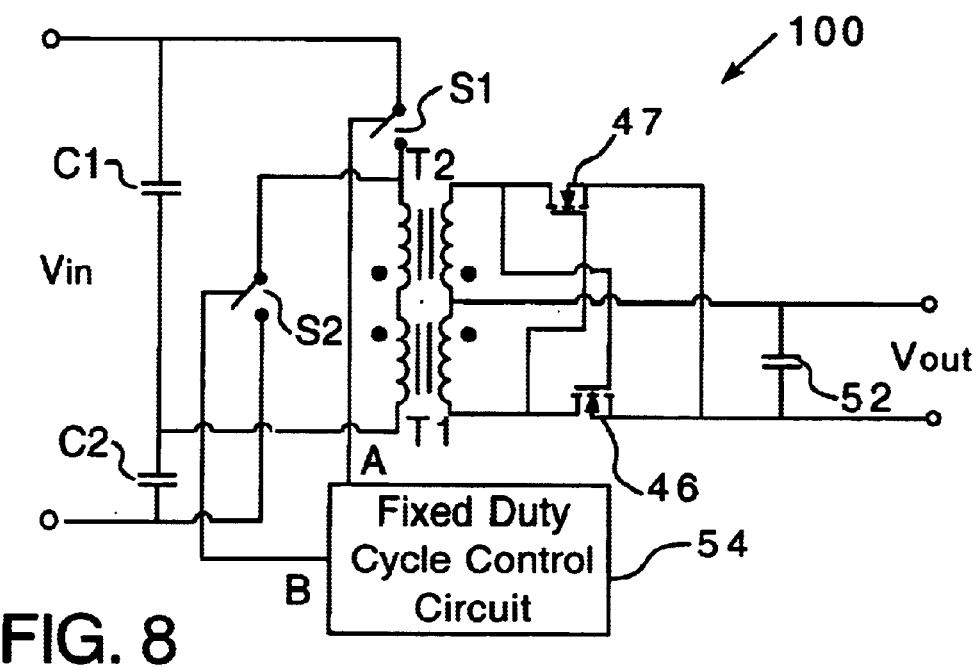

Further, in such an embodiment, the SRs 46, 47 may be configured in a self-driven mode. FIG. 8 illustrates such an embodiment. In FIG. 8, the SRs 46, 47 are illustrated as N-channel MOSFETs with their control (i.e., gate) terminals coupled to the secondary transformer windings of transformers T2, T1 respectively. That is, the control terminal of SR 46 is coupled to the secondary winding of transformer T2, and the control terminal of SR 47 is coupled to the secondary winding of transformer T1. Gate drive for each SR 46, 47 may be derived from the opposite side, drain connection (note that the gate of SR S3 is coupled to the drain terminal of SR S4 and vice versa) due to the fact that this voltage is proportional to $V_{in}$ during the alternate half cycle. A fixed duty cycle control circuit 54 controls the primary switches S1, S2. When both S1 and S2 are off, both SRs 46, 47 are also off. During this time interval, current may freewheel through the intrinsic body diodes of the SRs 46, 47. The body diode loss may be controlled by keeping the freewheel mode confined to a narrow time interval.

Although the present invention has been described herein with respect to certain embodiments, those of ordinary skill in the art will recognize that many modifications and variations of the present invention may be implemented. For example, the transformers T1, T2 may include multiple primary, secondary, or tertiary windings. The foregoing description and the following claims are intended to cover all such modifications and variations.

What is claimed is:

1. A DC-DC power converter comprising:
    first and second transformers, wherein each of the first and second transformers includes a primary winding and a secondary winding;
    a double-ended input circuit including at least two primary switches, wherein the double-ended input circuit is for generating an alternating voltage across the primary windings of the first and second transformers;
    a control circuit for controlling the at least two primary switches such that the at least two primary switches are simultaneously OFF for a first time period during a switching cycle of the converter;
    a first synchronous rectifier coupled to the secondary winding of the first transformer; and
    a second synchronous rectifier coupled to the secondary winding of the second transformer, wherein the control circuit is for controlling the first and second synchronous rectifiers such that the first and second synchronous rectifiers are simultaneously ON for a second time period during the switching cycle.

2. The converter of claim 1, wherein:
    the first synchronous rectifier is for rectifying a voltage across the secondary winding of the first transformer; and
    the second synchronous rectifier is for rectifying a voltage across the secondary winding of the second transformer.

3. The converter of claim 2, wherein the control circuit includes a PWM control circuit.

4. The converter of claim 3, wherein:
    the PWM control circuit is for controlling the first synchronous rectifier such that when a first of the at least two primary switches is ON, the first synchronous rectifier is simultaneously ON such that the first transformer transfers energy forward; and
    the PWM control circuit is for controlling the second synchronous rectifier such that when a second of the at least two primary switches is ON, the second synchronous rectifier is simultaneously ON such that second transformer transfers energy forward.

5. The converter of claim 4, wherein:
    the PWM control circuit is for controlling the first synchronous rectifier such that the first synchronous rectifier is turned ON prior to the ON period of the first of the at least two primary switches, such that there exists a first delay between the initiation of the ON period of the first synchronous rectifier and the ON period of the first of the least two primary switches; and
    the PWM control circuit is for controlling the second synchronous rectifier such that the second synchronous rectifier is turned ON prior to the ON period of the second of the at least two primary switches, such that there exists a second delay between the initiation of the ON period of the second synchronous rectifier and the ON period of the second of the at least two primary switches.

6. The converter of claim 5, wherein:
    the first transformer is for storing energy when the second of the at least two primary switches is ON; and
    the first synchronous rectifier, when ON, is for discharging the energy stored in the first transformer.

7. The converter of claim 6, wherein:
    the second transformer is for storing energy when the first of the at least two primary switches is ON; and
    the second synchronous rectifier, when ON, is for discharging the energy stored in the second transformer.

8. The converter of claim 7, wherein the double-ended input circuit includes a half-bridge input circuit.

9. The converter of claim 8, wherein:

the primary windings of the first and second transformers are connected in series; and wherein the secondary windings of the first and second transformers are connected in series.

10. The converter of claim 9, wherein a turns ratio of the first transformer equals a turns ratio of the second transformer.

11. The converter of claim 7, wherein the double-ended input circuit includes a full-bridge input circuit.

12. The converter of claim 7, wherein the double-ended input circuit includes a push-pull input circuit.

13. The converter of claim 7, wherein:

the first synchronous rectifier includes first and second terminals, wherein the first terminal is connected to the secondary winding of the first transformer;

the second synchronous rectifier includes first and second terminals, wherein the first terminal of the second synchronous rectifier is connected to the secondary winding of the second transformer and wherein the second terminal of the second synchronous rectifier is connected to the second terminal of the first synchronous rectifier.

14. The converter of claim 13, further comprising an output capacitor connected to the second terminal of first synchronous rectifier and connected to the second terminal of the second synchronous rectifier.

15. A DC-DC power converter comprising:

first and second transformers, wherein each of the first and second transformers includes a primary winding and a secondary winding;

a half-bridge input circuit including first and second primary switches, wherein the half-bridge input circuit is for cyclically coupling an input voltage to the first and second transformers;

a first synchronous rectifier for rectifying a voltage across the secondary winding of the first transformer;

a second synchronous rectifier for rectifying a voltage across the secondary winding of the second transformer; and a PWM control circuit for:

controlling the first and second primary switches such that the first and second primary switches are simultaneously OFF for a first time period during a switching cycle of the converter; and controlling the first and second synchronous rectifiers such that the first and second synchronous rectifiers are simultaneously ON for a second time period during the switching cycle of the converter.

16. The converter of claim 15, wherein:

the PWM control circuit is for controlling the first synchronous rectifier such that when the first primary switch is ON, the first synchronous rectifier is simultaneously ON such that the first transformer transfers energy forward; and the PWM control circuit is for controlling the second synchronous rectifier such that when the second primary switch is ON, the second synchronous rectifier is simultaneously ON such that second transformer transfers energy forward.

17. The converter of claim 16, wherein:

the PWM control circuit is for controlling the first synchronous rectifier such that the first synchronous rectifier is turned ON prior to the ON period of the first primary switch, such that there exists a first delay between the initiation of the ON period of the first synchronous rectifier and the ON period of the first primary switch; and the PWM control circuit is for controlling the second synchronous rectifier such that the second synchronous rectifier is turned ON prior to the ON period of the second primary switch, such that there exists a second delay between the initiation of the ON period of the second synchronous rectifier and the ON period of the second primary switch.

18. The converter of claim 17, wherein:

the first transformer is for storing energy when the second primary switch is ON; and the first synchronous rectifier, when ON, is for discharging the energy stored in the first transformer.

19. The converter of claim 18, wherein:

the second transformer is for storing energy when the first primary switch is ON; and the second synchronous rectifier, when ON, is for discharging the energy stored in the second transformer.

20. The converter of claim 19, wherein:

the primary windings of the first and second transformers are connected in series; and wherein the secondary windings of the first and second transformers are connected in series.

21. The converter of claim 20, wherein a turns ratio of the first transformer equals a turns ratio of the second transformer.

22. The converter of claim 21, wherein:

the first synchronous rectifier includes first and second terminals, wherein the first terminal is connected to the secondary winding of the first transformer;

the second synchronous rectifier includes first and second terminals, wherein the first terminal of the second synchronous rectifier is connected to the secondary winding of the second transformer and wherein the second terminal of the second synchronous rectifier is connected to the second terminal of the first synchronous rectifier.

23. The converter of claim 22, further comprising an output capacitor connected to the second terminal of first synchronous rectifier and connected to the second terminal of the second synchronous rectifier.

24. A power converter comprising:

first and second transformers, wherein each of the first and second transformers includes a primary winding and a secondary winding;

a double-ended input circuit including at least two primary switches, wherein the double-ended input circuit is for generating an alternating voltage across the primary windings of the first and second transformers;

a fixed duty cycle control circuit for controlling the at least two primary switches such that the at least two primary switches have a fixed duty cycle and are simultaneously OFF for a fixed time period during a switching cycle of the converter;

a first self-driven synchronous rectifier for rectifying a voltage across the secondary winding of the first transformer; and a second self-driven synchronous rectifier for rectifying a voltage across the secondary winding of the second transformer.

25. The power converter of claim 24, wherein:

the first self-driven synchronous rectifier includes a control terminal connected to the secondary winding of the second transformer; and the second self-driven synchronous rectifier includes a control terminal connected to the secondary winding of the first transformer.

26. The converter of claim 25, wherein:

the first transformer is for storing energy when the second of the at least two primary switches is ON; and the first synchronous rectifier is for discharging the energy stored in the first transformer.

27. The converter of claim 26, wherein:

the second transformer is for storing energy when the first of the at least two primary switches is ON; and the second synchronous rectifier is for discharging the energy stored in the second transformer.

* * * * *